(12) United States Patent
Hamaguchi et al.

(10) Patent No.: US 6,242,760 B1
(45) Date of Patent: Jun. 5, 2001

(54) OPTICAL SEMICONDUCTOR DEVICE WITH ENHANCED LIGHT RECEPTION

(75) Inventors: Shin-ichi Hamaguchi, Amagasaki; Yuzo Shimizu, Mukou; Toru Tsuruta, Suita; Masanori Hirose, Nagaokakyou, all of (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/350,996

(22) Filed: Jul. 12, 1999

(30) Foreign Application Priority Data

Jul. 13, 1998 (JP) .................................................. 10/196993

(51) Int. Cl.[7] .......................... H01L 27/15; H01L 31/0203
(52) U.S. Cl. ................................ 257/80; 257/81; 257/82; 257/84; 257/433; 257/435
(58) Field of Search ................................ 257/80, 81, 82, 257/84, 432, 433, 435, 436, 83

(56) References Cited

FOREIGN PATENT DOCUMENTS

| | | |
|---|---|---|
| 6433733 | 2/1989 | (JP) . |
| 4162783 | 6/1992 | (JP) . |
| 773503 | 3/1995 | (JP) . |
| 7106702 | 4/1995 | (JP) . |
| 07211985 | 8/1995 | (JP) . |
| 851254 | 2/1996 | (JP) . |
| 955532 | 2/1997 | (JP) . |

OTHER PUBLICATIONS

Japanese Patent Office with English translation, Jul. 6, 2999.

*Primary Examiner*—Minh Loan Tran
(74) *Attorney, Agent, or Firm*—Stevens, Davis, Miller & Mosher, LLP

(57) ABSTRACT

An object is that stray light carriers are absorbed, and hence a signal larger than actual signal will not be outputted, thereby to output more precise signals. For achieving the foregoing, a concave portion is provided on the surface of a semiconductor substrate, a light receiving element for signal detection is provided around the concave portion, a semiconductor laser element is mounted in the concave portion, and a light shielding area is provided on the side existing between the semiconductor laser element and the light receiving element for signal detection of the sides of the concave portion. This causes stray light contained in the light emitted from the semiconductor laser element to be cut off at the light shielding area. Consequently, around the light receiving element for signal detection, the occurrence of stray light carriers on the surface of the semiconductor substrate can be prevented, and hence the stray light carriers are not absorbed by the light receiving element for signal detection. Therefore, the signal of an optical recording medium can be outputted with more precision.

5 Claims, 15 Drawing Sheets ated the like.

OPTICAL SEMICONDUCTOR DEVICE WITH ENHANCED LIGHT RECEPTION

BACKGROUND OF THE INVENTION

1. Field of the Invention

The present invention relates to an optical semiconductor device having both light emission and light reception abilities for use in optical information processing, optical measurement, optical communication, and the like.

2. Prior Art

As optical semiconductor device for use in optical information processing, optical measurement, optical communication, and the like, the one in which a light source and a light-receptive part (photodetector) are mounted in the same package has found use in recent years.

Below, a conventional optical semiconductor device will now be described. FIG. 13 is a plan view schematically showing the plane layout of a conventional optical semiconductor device. FIG. 14 is a schematic cross-sectional view taken on line A–A' of a semiconductor substrate 1 shown in FIG. 13. Further, FIG. 15 is a schematic cross-sectional view taken on line B–B' of the semiconductor substrate 1 shown in FIG. 13.

Referring now to FIGS. 13, 14, and 15, the semiconductor substrate 1 is composed of, for example, Si, and it is provided with a rectangular concave portion 1a on the surface. A semiconductor laser element 2 is composed of, for example, GaAs, and it serves as light source for emitting signal detection light. The semiconductor laser element 2 is mounted at the concave portion 1a of the semiconductor substrate 1 so that the optical axis of the signal detection light is generally in parallel relationship with the surface of the semiconductor substrate 1, thus to be integral with the semiconductor substrate 1. Specifically, the semiconductor laser element 2 is fixed on the underside of the concave portion 1a.

The above-described concave portion 1a is so configured as to reflect the signal detection light of the semiconductor laser element 2 by one inclined side thereof in a direction substantially perpendicular to the surface of the semiconductor substrate 1. That is, one inclined side of the concave portion 1a becomes a reflection surface. Further, the one electrode for applying a voltage to the semiconductor laser element 2, which is not shown, is formed at the region, on which the semiconductor laser element 2 is mounted, in the underside of the concave portion 1a. Whereas the other electrode is formed on the opposite one of the surface of the semiconductor laser element 2 in contact with the underside of the concave portion 1a.

Each one of the light receiving elements for signal detection 3, 4, 5, 6, 7, and 8 is comprised of an impurity diffusion area composed of, for example, Si, and it serves as light-receptive part. It is formed in the semiconductor substrate 1 by impurity diffusion. The light receiving elements for signal detection 3, 4, 5, 6, 7, and 8 are selectively formed in the peripheral area of the concave portion 1a on the surface of the semiconductor substrate 1, for example, in the area lateral to the concave portion 1a taking the direction of emission of the signal detection light from the semiconductor laser element 2 as forward direction on the surface of the semiconductor substrate 1. Thus, they receive return light from an optical recording medium.

The above-described semiconductor substrate 1 and each one of the light receiving elements for signal detection 3, 4, 5, 6, 7, and 8 are mutually opposite in conductivity type. Between the semiconductor substrate 1 and the light receiving elements for signal detection 3, 4, 5, 6, 7, and 8 is applied such a voltage as to result in a reverse bias.

A monitor area 12 comprises an impurity diffusion area composed of, for example, Si, and it is provided in the backward direction of the concave portion 1a on the surface of the semiconductor substrate 1. The quantity of signal detection light from the semiconductor laser element 2 is detected by the monitor area 12.

The above-described semiconductor substrate 1 and the monitor area 12 are mutually opposite in conductivity type. Between the semiconductor substrate 1 and the monitor area 12 is applied such a voltage as to result in a reverse bias. The impurity concentration of the monitor area 12 is set so as to be comparable to that of the portions of the respective light receiving elements for signal detection 3, 4, 5, 6, 7, and 8.

With this optical semiconductor device, the signal detection light is emitted from the semiconductor laser element 2 substantially in parallel with the surface of the semiconductor substrate 1 as shown by an arrow 9 in FIG. 15. Then, the signal detection light is reflected by the inclined surface of the concave portion 1a existing in front thereof in a direction substantially perpendicular to the surface of the semiconductor substrate 1, thus to be applied onto an object of signal detection such as optical recording medium.

In this process, the light receiving elements for signal detection 3, 4, 5, 6, 7, and 8 are formed at the positions deviating from the direction of emission of signal detection light from the semiconductor laser element 2. For example, the light receiving elements for signal detection 3, 4, 5, 6, 7, and 8 are formed in the area lateral to the concave portion 1a taking the direction of emission of the signal detection light from the semiconductor laser element 2 as forward direction, in the surface of the semiconductor substrate 1. This is achieved for preventing the situation as follows: that is, the signal detection light emitted from the semiconductor laser element 2 enters the semiconductor substrate 1, resulting in the occurrence of carriers, which adversely affect each signal detection level of the light receiving elements for signal detection 3, 4, 5, 6, 7, and 8. It is noted that, each position of the light receiving elements for signal detection 3, 4, 5, 6, 7, and 8 may properly be in the peripheral area of the semiconductor laser element 2, and that the number thereof may properly be one or more.

For the optical semiconductor device configured as described above, the operation thereof will now be described below. First, the signal detection light emitted from the semiconductor laser element 2 is converged on an optical recording medium (not shown) through an objective lens (not shown). Then, the light corresponding to the signal of the optical recording medium is reflected therefrom to become return light, which is then converged on the light receiving elements for signal detection 3, 4, 5, 6, 7, and 8. Consequently, optical signals are outputted from the respective light receiving elements for signal detection 3, 4, 5, 6, 7, and 8. In this process, the quantity of the signal detection light emitted from the semiconductor laser element 2 is being monitored in the monitor area 12, during which the semiconductor laser element 2 is controlled so that the value is made constant.

Incidentally, with the above-described prior art configuration, signal detection light is emitted from the semiconductor laser element 2 in a direction shown by the arrow 9. In addition, unnecessary light other than the signal detection light (below, referred to as stray light) occurs.

Below, a concrete description will now be given to stray light. The light in association with the optical semiconductor device includes laser light emitted from the semiconductor laser element 2, and return light resulting from reflection from a medium such as optical disk, or magneto-optic disk. However, it is the stray light resulting from the laser light emitted from the semiconductor laser element 2 that matters in the present invention The laser light emitted from the semiconductor laser element 2 includes the light emitted from the front and the light emitted from the rear, and also includes the effective light and the ineffective light for signal detection.

The laser light, including both the light from the front, and the light from the rear of the semiconductor laser element 2, is generally emitted extending 180 degrees both vertically and horizontally. In this step, the larger the output angle of the laser light is, the smaller the light quantity thereof is.

In the laser light having the above-described emitting characteristics, the light emitted forward from the front of the semiconductor laser element 2 is effective for signal detection, which serves as signal detection light. On the other hand, the light emitted in directions other than the forward direction, specifically, in an oblique direction or just sideward is ineffective, which results in stray light. when the semiconductor substrate 1 is irradiated with the stray light, stray light carriers occur in the semiconductor substrate 1.

On the other hand, the light emitted backward out of the light emitted from the rear of the semiconductor laser element 2 is applied in the vicinity of the monitor area 12. The light emitted backward is used for detecting the quantity of light from the semiconductor laser element 2. Further, the light emitted in directions other than the backward direction, specifically, in an oblique direction or just sideward results in stray light. The irradiation of the underside, or sides of the concave portion 1a of the semiconductor substrate 1 with the stray light results in the occurrence of carriers in the semiconductor substrate 1. The carriers are partially captured by the monitor area 12, while most of the remainder results in stray light carriers, which adversely affect the light receiving elements for signal detection 3, 4, 5, 6, 7, and 8.

The front of the semiconductor laser element 2 lies in extremely close proximity to the inclined side (front side) of the concave portion 1a. Accordingly, most of the stray light emitted from the front impinges on the inclined side of the concave portion 1a. Consequently, the stray light carriers resulting from the stray light emitted from the front less affect the light receiving elements for signal detection 3, 4, 5, 6, 7, and 8.

However, the rear of the semiconductor laser element 2 and the rear side of the concave portion 1a are spaced at a relatively large distance from each other. Accordingly, the stray light emitted from the rear of the semiconductor laser element 2 tends to be applied onto the underside, or the sides of the concave portion 1a. The underside and the sides of the concave portion 1a are at a short distance from the positions where the light receiving elements for signal detection 3, 4, 5, 6, 7, and 8 are formed. Consequently, the straylight carriers occurred in the vicinity of the underside and the sides of the concave portion 1a tend to adversely affect the light receiving elements for signal detection 3, 4, 5, 6, 7, and 8.

In other words, the stray light emitted from the rear of the semiconductor laser element 2 is directly or indirectly applied onto the surface, especially the underside or the sides of the concave portion 1a, of the semiconductor substrate 1. This results in the occurrence of stray light carriers around the concave portion 1a on the surface of the semiconductor substrate 1.

The stray light carriers resulting from the stray light applied onto the sides of the concave portion 1a on the surface of the semiconductor substrate 1 are found to be around the light receiving elements for signal detection 3, 4, 5, 6, 7, and 8. Similarly, the stray light carriers resulting from the stray light applied onto the underside of the concave portion 1a are also found to be around the light receiving elements for signal detection 3, 4, 5, 6, 7, and 8. This results in the following problems: that is, the stray light carriers are absorbed by the light receiving elements for signal detection 3, 4, 5, 6, 7, and 8, which causes the optical signals of larger level than actual signal level to be outputted from the light receiving elements for signal detection 3, 4, 5, 6, 7, and 8.

SUMMARY OF THE INVENTION

The present invention has been achieved in view of the foregoing. It is therefore an object of the present invention to provide an optical semiconductor device capable of outputting a signal of an object of signal detection with more precision.

An optical semiconductor device of a first invention comprises: a semiconductor substrate; a concave portion provided on the surface of the semiconductor substrate; a laser light source for irradiating an object of signal detection with signal detection light, the laser light source being mounted on the concave portion; a light-receptive part for receiving return light from the object of signal detection, the light-receptive part being provided in the peripheral area of the concave portion on the surface of the semiconductor substrate; and a light shielding area provided on at least the side existing between the laser light source and the light-receptive part of the concave portion.

In this case, the underside of the concave portion is a rectangular flat surface substantially parallel to the surface of the semiconductor substrate. Also, at least one side of the concave portion becomes a reflection surface inclined to the underside of the concave portion. Further, the laser light source is fixed on the underside of the concave portion. Then, the signal detection light is emitted substantially parallel to the underside of the concave portion toward the reflection surface; and the signal detection light is reflected from the reflection surface in a direction substantially perpendicular to the surface of the semiconductor substrate.

Preferred examples of the laser light source to be used include a semiconductor laser element. Also, preferred examples of the light-receptive part to be used include an impurity diffusion area with a conductivity type opposite to that of the semiconductor substrate. The impurity diffusion area is formed in the semiconductor substrate. Further, preferred examples of the light shielding area to be used include a metal film.

With this configuration, stray light emitted from the laser light source can be prevented from entering the semiconductor substrate from the side of the concave portion, i.e., from around the light-receptive part by the light shielding area. Therefore, the occurrence of stray light carriers around the light-receptive part can be inhibited. This can prevent the stray light carriers around the light-receptive part from being absorbed by the light-receptive part. Consequently, the signal of the object of signal detection can be outputted with more precision. The stray light carriers occurs by irradiating the semiconductor substrate with stray light. Accordingly, provision of the light shielding area on the semiconductor substrate can inhibit the occurrence of stray light carriers.

An optical semiconductor device of a second invention comprises: a semiconductor substrate; a concave portion provided on the surface of the semiconductor substrate; a laser light source for irradiating an object of signal detection with signal detection light, the laser light source being mounted on the concave portion; a light-receptive part for receiving return light from the object of signal detection, the light-receptive part being provided in the peripheral area of the concave portion on the surface of the semiconductor substrate; and an absorption area of stray light carriers provided at least between the laser light source and the light-receptive part in the semiconductor substrate.

In this case, the underside of the concave portion is a rectangular flat surface substantially parallel to the surface of the semiconductor substrate. Also, at least one side of the concave portion becomes a reflection surface inclined to the underside of the concave portion. Further, the laser light source is fixed on the underside of the concave portion. Then, the signal detection light is emitted substantially parallel to the underside of the concave portion toward the reflection surface; and the signal detection light is reflected from the reflection surface in a direction substantially perpendicular to the surface of the semiconductor substrate.

Preferred examples of the laser light source to be used include a semiconductor laser element. Also, preferred examples of the light-receptive part to be used include an impurity diffusion area with a conductivity type opposite to that of the semiconductor substrate. The impurity diffusion area is formed in the semiconductor substrate. Preferred examples of the absorption area of stray light carriers to be used include an impurity diffusion area with a conductivity type opposite to that of the semiconductor substrate. The absorption area of stray light carriers is formed in the semiconductor substrate, and reverse-biased with respect to the semiconductor substrate.

With this configuration, the stray light carriers arising from stray light emitted from the laser light source, in the vicinity of the side of the concave portion of the semiconductor substrate, i.e., around the light-receptive part can be absorbed by the absorption area of stray light carriers. Consequently, the stray light carriers around the light-receptive part can be prevented from being absorbed by the light-receptive part. Therefore, the signal of the object of signal detection can be outputted with more precision.

An optical semiconductor device of a third invention comprises: a semiconductor substrate; a laser light source for irradiating an object of signal detection with signal detection light, the laser light source being mounted at the position lateral to the semiconductor substrate; a light-receptive part for receiving return light from the object of signal detection, the light-receptive part being provided on the top side of the semiconductor substrate; and a light shielding area provided on the side existing between the light-receptive part and the laser light source, of the sides of the semiconductor substrate.

In this case, the signal detection light is emitted in a direction substantially perpendicular to the top side of the semiconductor substrate.

Also, the underside of the semiconductor substrate is fixed, for example, on the top side of a base board, and the laser light source is fixed on the side of the base board. This can implement the semiconductor substrate and the laser light source by a single device. Preferred examples of the laser light source to be used include a semiconductor laser element. Also, preferred examples of the light-receptive part to be used include an impurity diffusion area with a conductivity type opposite to that of the semiconductor substrate. The impurity diffusion area is formed in the semiconductor substrate. Further, preferred examples of the light shielding area to be used include a metal film.

With this configuration, the stray light emitted from the laser light source is prevented from entering the semiconductor substrate from the side existing between the light-receptive part and the laser light source of the sides of the semiconductor substrate, i.e., from around the light-receptive part, by the light shielding area. Accordingly, the occurrence of stray light carriers around the light-receptive part can be inhibited. This can prevent the stray light carriers around the light-receptive part from being absorbed by the light-receptive part. Therefore, the signal of the object of signal detection can be outputted with more precision.

An optical semiconductor device of a fourth invention, comprises: a semiconductor substrate; a laser light source for irradiating an object of signal detection with signal detection light, the laser light source being mounted at the position lateral to the semiconductor substrate; a light-receptive part for receiving return light from the object of signal detection, the light-receptive part being provided on the top side of the semiconductor substrate; and an absorption area of stray light carriers provided between the light-receptive part and the laser light source, in the semiconductor substrate.

In this case, the signal detection light is emitted in a direction substantially perpendicular to the top side of the semiconductor substrate.

Also, the underside of the semiconductor substrate is fixed, for example, on the top side of a base board, and the laser light source is fixed on the side of the base board. This can implement the semiconductor substrate and the laser light source by a single device. Preferred examples of the laser light source to be used include a semiconductor laser element. Also, preferred examples of the light-receptive part to be used include an impurity diffusion area with a conductivity type opposite to that of the semiconductor substrate, and the impurity diffusion area is formed in the semiconductor substrate. Further, preferred examples of the absorption area of stray light carriers to be used include an impurity diffusion area with a conductivity type opposite to that of the semiconductor substrate, and the absorption area of stray light carriers is formed in the semiconductor substrate, and reverse-biased with respect to the semiconductor substrate.

With this configuration, the stray light carriers arising from stray light emitted from the laser light source, in the vicinity of the side existing between the light-receptive part and the laser light source of the sides of the semiconductor substrate, i.e., around the light-receptive part can be absorbed by the absorption area of stray light carriers. Consequently, the stray light carriers around the light-receptive part can be prevented from being absorbed by the light-receptive part. Therefore, the signal of the object of signal detection can be outputted with more precision.

An optical semiconductor device of a fifth invention, comprises: a semiconductor substrate; a laser light source for irradiating an object of signal detection with signal detection light, the laser light source being mounted on the surface of the semiconductor substrate; a light-receptive part for receiving return light from the object of signal detection, the light-receptive part being provided on the position around the laser light source on the surface of the semiconductor substrate; an optical element provided on the light-receptive part; and a light shielding area provided on the portion existing-between the laser light source and the optical element, of the surface of the semiconductor substrate.

In this case, the optical element comprises a micro-prism having a reflection surface inclined to the surface of the semiconductor substrate; the signal detection light is emitted substantially parallel to the surface of the semiconductor substrate, and is reflected from the reflection surface in a direction substantially perpendicular to the surface of the semiconductor substrate.

Preferred examples of the laser light source to be used include a semiconductor laser element. Also, preferred examples of the light-receptive part to be used include an impurity diffusion area with a conductivity type opposite to that of the semiconductor substrate. The impurity diffusion area is formed in the semiconductor substrate. Further, preferred examples of the light shielding area to be used include a metal film.

With this configuration, the stray light emitted from the laser light source is prevented from entering the semiconductor substrate from the portion existing between the laser light source and the optical element of the surface of the semiconductor substrate, i.e., from around the light-receptive part, by the light shielding area. Accordingly, the occurrence of stray light carriers around the light-receptive part can be inhibited. Consequently, the stray light carriers around the light-receptive part can be prevented from being absorbed by the light-receptive part. Therefore, the signal of the object of signal detection can be outputted with more precision.

An optical semiconductor device of a sixth invention, comprises: a semiconductor substrate; a laser light source for irradiating an object of signal detection with signal detection light, the laser light source being mounted on the surface of the semiconductor substrate; a light-receptive part for receiving return light from the object of signal detection, the light-receptive part being provided in the position around the laser light source on the surface of the semiconductor substrate; an optical element provided on the light-receptive part; and an absorption area of stray light carriers between the laser light source and the optical element, of the surface of the semiconductor substrate.

In this case, the optical element comprises a micro-prism having a reflection surface inclined to the surface of the semiconductor substrate; the signal detection light is emitted substantially parallel to the surface of the semiconductor substrate, and is reflected from the reflection surface in a direction substantially perpendicular to the surface of the semiconductor substrate.

Preferred examples of the laser light source to be used include a semiconductor laser element. Also, preferred examples of the light-receptive part to be used include an impurity diffusion area with a conductivity type opposite to that of the semiconductor substrate, and the impurity diffusion area is formed in the semiconductor substrate. Further, preferred examples of the absorption area of stray light carriers to be used include an impurity diffusion area with a conductivity type opposite to that of the semiconductor substrate, and the absorption area of stray light carriers is formed in the semiconductor substrate, and reverse-biased with respect to the semiconductor substrate.

With this configuration, the stray light carriers arising from stray light emitted from the laser light source, at the portion existing between the laser light source and the optical element of the surface of the semiconductor substrate, i.e., around the light-receptive part can be absorbed by the absorption area of stray light carriers. Consequently, the stray light carriers around the light-receptive part can be prevented from being absorbed by the light-receptive part. Therefore, the signal of the object of signal detection can be outputted with more precision.

DETAILED DESCRIPTION OF THE PREFERRED EMBODIMENTS

[First Embodiment]

Below, a first embodiment of the present invention will be described with reference to the drawings.

Figure 1:
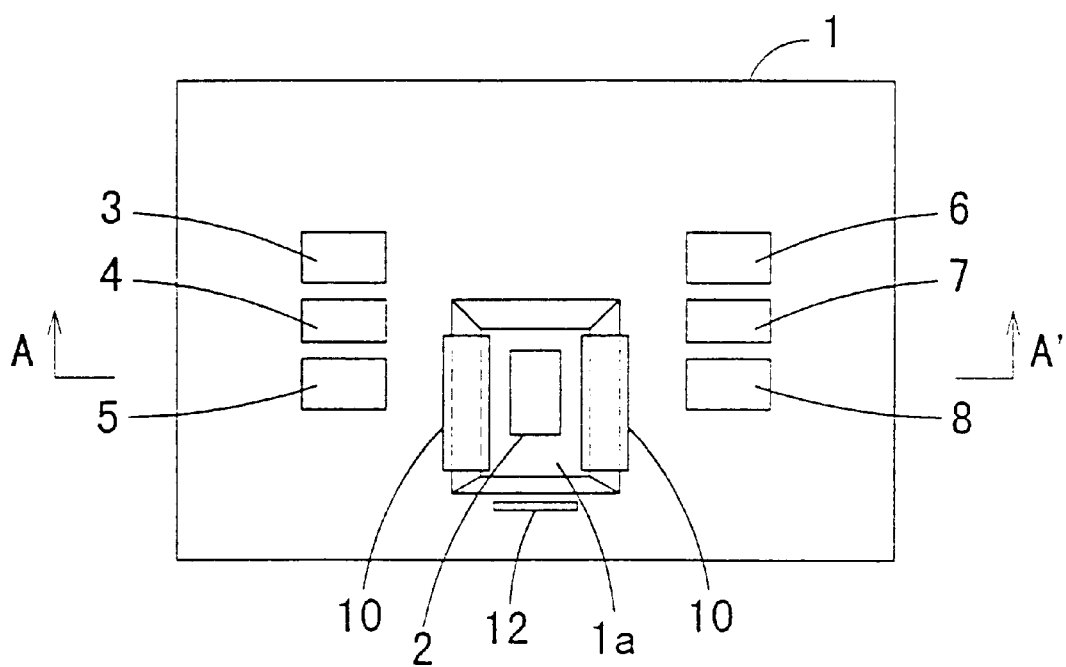
FIG. 1 is a plan view showing the configuration of an optical semiconductor device in a first embodiment of the present invention.
Figure 2:
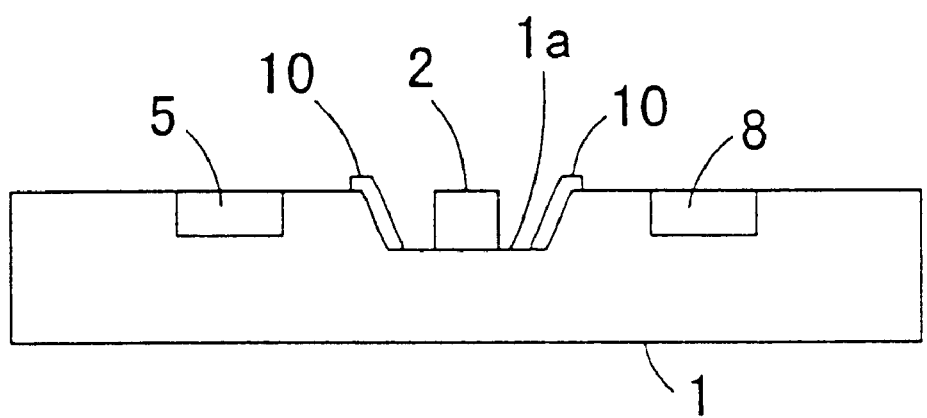
FIG. 2 is a cross-sectional view showing the configuration of the same optical semiconductor device.

FIG. 1 is a plan view schematically showing the plane layout of an optical semiconductor device in the first embodiment of the present invention. FIG. 2 is a schematic cross-sectional view taken on line A–A' of a semiconductor substrate 1 shown in FIG. 1.

Referring now to FIGS. 1 and 2, the semiconductor substrate 1 is composed of, for example, Si, and it is provided with a rectangular concave portion 1a on the surface. A semiconductor laser element 2 is composed of, for example, GaAs, and it serves as laser light source for emitting signal detection light. The semiconductor laser element 2 is mounted at the concave portion 1a of the semiconductor substrate 1 so that the optical axis of signal detection light is generally in parallel relationship with the surface of the semiconductor substrate 1, thus to be integral with the semiconductor substrate 1. Specifically, the semiconductor laser element 2 is fixed on the underside of the concave portion 1a.

The above-described concave portion 1a is so configured that the underside thereof is a flat surface substantially in parallel with the surface of the semiconductor substrate 1, and the signal detection light from the semiconductor laser element 2 is to be reflected by one inclined side thereof in a direction substantially perpendicular to the surface of the semiconductor substrate 1. That is, one inclined side of the concave portion 1a becomes a reflection surface. Further, the one electrode for applying a voltage to the semiconductor laser element 2, which is not shown, is formed at the region, in the underside of the concave portion 1a, on which the semiconductor laser element 2 is mounted. Whereas the other electrode is formed on the opposite one of the surface of the semiconductor laser element 2 in contact with the underside of the concave portion 1a.

Each one of the light receiving elements for signal detection 3, 4, 5, 6, 7, and 8 comprises an impurity diffusion area composed of, for example, Si, and it serves as light-receptive part. It is formed in the semiconductor substrate 1 by impurity diffusion. The light receiving elements for signal detection 3, 4, 5, 6, 7, and 8 are selectively formed in the peripheral area of the concave portion 1a on the surface of the semiconductor substrate 1, for example, in the area lateral to the concave portion 1a taking the direction of emission of the signal detection light from the semiconductor laser element 2 as forward direction, on the surface of the semiconductor substrate 1. Thus, they receive return light from an optical recording medium.

The above-described semiconductor substrate 1 and each one of the light receiving elements for signal detection 3, 4, 5, 6, 7, and 8 are mutually opposite in conductivity type. Between the semiconductor substrate 1 and the light receiving elements for signal detection 3, 4, 5, 6, 7, and 8 is applied such a voltage as to result in a reverse bias.

A monitor area 12 comprises an impurity diffusion area composed of, for example, Si, and it is provided in the backward direction of the concave portion 1a on the surface of the semiconductor substrate 1. The quantity of signal detection light from the semiconductor laser element 2 is detected by the monitor area 12.

The above-described semiconductor substrate 1 and the monitor area 12 are mutually opposite in conductivity type. Between the semiconductor substrate 1 and the monitor area 12 is applied such a voltage as to result in a reverse bias. The impurity concentration of the monitor area 12 is set so as to be comparable to that of the portions of the respective light receiving elements for signal detection 3, 4, 5, 6, 7; and 8.

The foregoing configuration is the same as that of the prior art example, and hence the basic operation thereof is the same as that of the prior art example.

Light shielding areas 10 are selectively provided on each side existing between the semiconductor laser element 2 and the light receiving elements for signal detection 3, 4, 5, 6, 7, and 8, and each area 10 comprises a material with a high reflectance. Each light shielding area 10 has a function as follows: that is, the stray light arising from the semiconductor laser element 2 is prevented from entering the semiconductor substrate 1 toward light receiving elements for signal detection 3, 4, 5, 6, 7, and 8; this inhibits the occurrence of stray light carriers around the concave portion 1a on the surface of the semiconductor substrate 1 (i.e., around the light receiving elements for signal detection 3, 4, 5, 6, 7, and 8) within the semiconductor substrate 1. This embodiment of the present invention is different from the prior art example in that the light shielding area 10 is thus provided.

Each light shielding area 10 is formed into, for example, specular reflection film by evaporating a metal film such as Au film on the semiconductor substrate 1 composed of, for example, Si. The thickness thereof may properly be on such an order as to permit no light transmission. However, it is preferably 0.3 μm or more. Also, it is more desirable that no light enters the substrate, and hence the higher the reflectance is, the better it is. The reflectance is preferably 95% or more (and 100% or less).

With the optical semiconductor device of this embodiment configured as described above, the operation thereof will now be described below.

First, at the instant when signal detection light is emitted from the semiconductor laser element 2 on the semiconductor substrate 1, stray light occurs. The stray light tries to enter the sides of the concave portion 1a. However, the light shielding areas 10 are provided respectively on each one of the two sides existing between the semiconductor laser element 2 and the light receiving elements for signal detection 3, 4, 5, 6, 7, and 8, of the four sides of the rectangular concave portion 1a. This can prevent the stray light from entering the semiconductor substrate 1 from the sides of concave portion 1a around the light receiving elements for signal detection 3, 4, 5, 6, 7, and 8. This can inhibit the occurrence of stray light carriers on the surface of the semiconductor substrate 1, around the concave portion 1a on the surface of the semiconductor substrate 1, i.e., around the light receiving elements for signal detection 3, 4, 5, 6, 7, and 8.

As described above, according to the first embodiment, the light shielding areas 10 are provided respectively on each one of the sides existing between the semiconductor laser element 2 and the light receiving elements for signal detection 3, 4, 5, 6, 7, and 8, of the sides of the concave portion 1a. This can prevent the stray light from entering the semiconductor substrate 1 from the sides around the light receiving elements for signal detection 3, 4, 5, 6, 7, and 8, of the sides of the concave portion 1a of the semiconductor substrate 1. This can inhibit the occurrence of stray light carriers around the concave portion 1a on the surface of the semiconductor substrate 1, i.e., around the light receiving elements for signal detection 3, 4, 5, 6, 7, and 8. Consequently, the stray light carriers can be prevented from being absorbed by the light receiving elements for signal detection 3, 4, 5, 6, 7, and 8 around the concave portion 1a on the surface of the semiconductor substrate 1. Therefore, the signals of the optical recording medium can be outputted with more precision.

Further, it is needless to say that provision of the light shielding area 10 on the underside of the concave portion 1a on the surface of the semiconductor substrate 1 also provides the same effects as those in the case where it is provided on the side as described above.

[Second Embodiment]

Below, a second embodiment of the present invention will be described with reference to the drawings.

Figure 3:
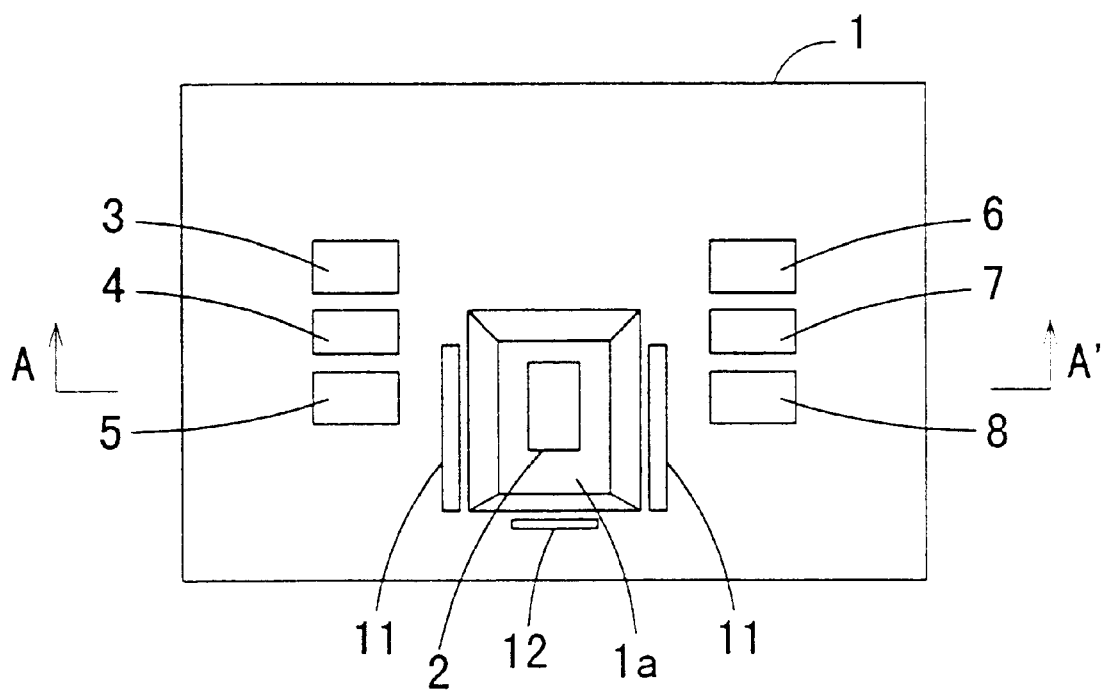
FIG. 3 is a plan view showing the configuration of an optical semiconductor device in a second embodiment of the present invention.
Figure 4:
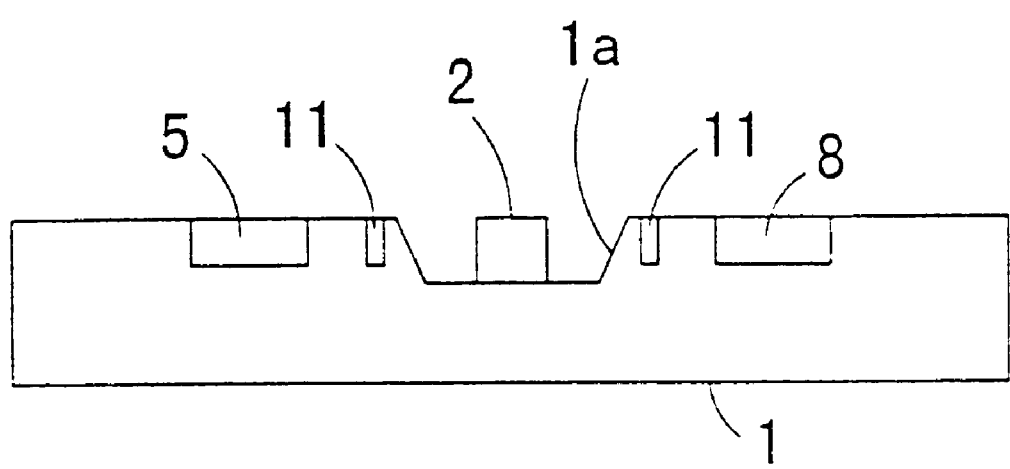
FIG. 4 is a cross-sectional view showing the configuration of the same optical semiconductor device.

FIG. 3 is a plan view schematically showing the plane layout of an optical semiconductor device in the second embodiment of the present invention. FIG. 4 is a schematic cross-sectional view taken on line A–A' of a semiconductor substrate 1 shown in FIG. 3.

Referring now to FIGS. 3 and 4, the semiconductor substrate 1 is composed of, for example, Si, and it is provided with a rectangular concave portion 1a on the surface. A semiconductor laser element 2 is composed of, for example, GaAs, and it serves as laser light source for emitting signal detection light. The semiconductor laser element 2 is mounted at the concave portion 1a of the semiconductor substrate 1 so that the optical axis of signal detection light is generally in parallel relationship with the surface of the semiconductor substrate 1, thus to be integral with the semiconductor substrate 1. Specifically, the semiconductor laser element 2 is fixed on the underside of the concave portion 1a.

The above-described concave portion 1a is so configured that the underside thereof is a flat surface substantially in parallel with the surface of the semiconductor substrate 1, and the signal detection light of the semiconductor laser element 2 is to be reflected by one inclined side thereof in a direction substantially perpendicular to the surface of the semiconductor substrate 1. That is, one inclined side of the concave portion 1a becomes a reflection surface Further, the one electrode for applying a voltage to the semiconductor laser element 2, which is not shown, is formed at the region, in the underside of the concave portion 1a, on which the semiconductor laser element 2 is mounted. Whereas the other electrode is formed on the opposite one of the surface of the semiconductor laser element 2 in contact with the underside of the concave portion 1a.

Each one of the light receiving elements for signal detection 3, 4, 5, 6, 7, and 8 comprises an impurity diffusion area composed of, for example, Si, and it serves as light-receptive part. It is formed in the semiconductor substrate 1 by impurity diffusion. The light receiving elements for signal detection 3, 4, 5, 6, 7, and 8 are selectively formed in the peripheral area of the concave portion 1a on the surface of the semiconductor substrate 1, for example, in the area lateral to the concave portion 1a taking the direction of emission of the signal detection light from the semiconductor laser element 2 as forward direction, on the surface of the semiconductor substrate 1. Thus, they receive return light from an optical recording medium.

The above-described semiconductor substrate 1 and each one of the light receiving elements for signal detection 3, 4, 5, 6, 7, and 8 are mutually opposite in conductivity type. Between the semiconductor substrate 1 and the light receiving elements for signal detection 3, 4, 5, 6, 7, and 8 is applied such a voltage as to result in a reverse bias.

A monitor area 12 comprises an impurity diffusion area composed of, for example, Si, and it is provided in the backward direction of the concave portion 1a on the surface of the semiconductor substrate 1. The quantity of signal detection light from the semiconductor laser element 2 is detected by the monitor area 12.

The above-described semiconductor substrate 1 and the monitor area 12 are mutually opposite in conductivity type. Between the semiconductor substrate 1 and the monitor area 12 is applied such a voltage as to result in a reverse bias. The impurity concentration of the monitor area 12 is set so as to be comparable to that of the portions of the respective light receiving elements for signal detection 3, 4, 5, 6, 7, and 8.

The foregoing configuration is the same as that of the prior art example, and hence the basic operation thereof is the same as that of the prior art example.

Absorption areas of stray light carriers 11 are composed of, for example, Si. They are selectively formed one at each of the portions existing between the semiconductor laser element 2 and the light receiving elements for signal detection 3, 4, 5, 6, 7, and 8 in the peripheral area of the concave portion 1a. Also, each one of the absorption areas of stray light carriers 11 comprises an impurity diffusion area of the same conductivity type as those of the light receiving elements for signal detection 3, 4, 5, 6, 7, and 8, that is, of the conductivity type opposite to that of the semiconductor substrate 1. Further, between the semiconductor substrate 1 and each one of the absorption areas of stray light carriers 11 is applied such a voltage as to result in a reverse bias.

In this case, the absorption areas of stray light carriers 11 are reverse-biased, which widen the depletion layer. This effects the absorption of holes when these areas are p-type, while effecting the absorption of electrons when these are n-type. The impurity concentration of absorption areas of stray light carriers 11 is set so as to be comparable to that of each portion of the light receiving elements for signal detection 3, 4, 5, 6, 7, and 8.

The stray light arising from the semiconductor laser element 2 enters the semiconductor substrate 1 toward the light receiving elements for signal detection 3, 4, 5, 6, 7, and 8. This results in the occurrence of stray light carriers in the vicinity of the sides of the concave portion 1a on the surface of the semiconductor substrate 1, i.e., around the light receiving elements for signal detection 3, 4, 5, 6, 7, and 8. Each one of the absorption areas of stray light carriers 11 has a function of absorbing the resulting stray light carriers. This embodiment is different from the prior art example in that the absorption areas of stray light carriers 11 are provided.

With the optical semiconductor device of this embodiment configured as described above, the operation thereof will now be described below.

First, at the instant when signal detection light is emitted from the semiconductor laser element 2 on the semiconductor substrate 1, stray light occurs. The stray light enters the sides of the concave portion 1a of the semiconductor substrate 1, resulting in the occurrence of stray light carriers in the vicinity of sides of the concave portion 1a of the semiconductor substrate 1 within the semiconductor substrate 1. However, the absorption areas of stray light carriers 11 are provided between the semiconductor laser element 2 and the light receiving elements for signal detection 3, 4, 5, 6, 7, and 8, on the semiconductor substrate 1. With this configuration, the absorption areas of stray light carriers 11 absorb the stray light carriers arising especially around the concave portion 1a on the surface of the semiconductor substrate 1. This prevents the carriers from being absorbed by the light receiving elements for signal detection 3, 4, 5, 6, 7, and 8.

As described above, according to the second embodiment, the absorption areas of stray light carriers 11 are provided between the semiconductor laser element 2 and the light receiving elements for signal detection 3, 4, 5, 6, 7, and 8, of the surface portion of the semiconductor substrate 1. This enables the absorption of the stray light carriers arising around the concave portion 1a on the surface of the semiconductor substrate 1, i.e., around the light receiving elements for signal detection 3, 4, 5, 6, 7, and 8, from stray light. Consequently, the stray light carriers around the concave portion 1a can be prevented from being absorbed by the light receiving elements for signal detection 3, 4, 5, 6, 7, and 8. Therefore, the signals of the optical recording medium can be outputted with more precision.

Further, it is needless to say that provision of the absorption areas of stray light carriers 11 on the underside of the concave portion 1a on the surface of the semiconductor substrate 1 also provides the same effects as those in the case where it is provided on the sides as described above.

[Third Embodiment]

Below, a third embodiment of the present invention will be described with reference to the drawings.

Figure 5:
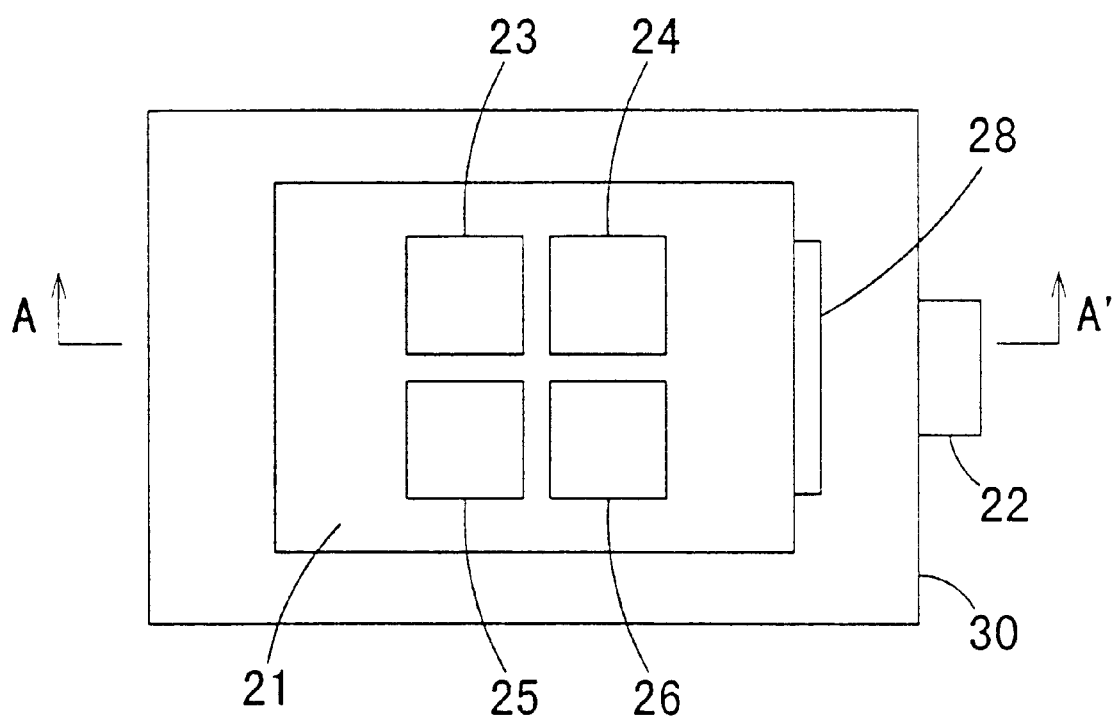
FIG. 5 is a plan view showing the configuration of an optical semiconductor device in a third embodiment of the present invention.
Figure 6:
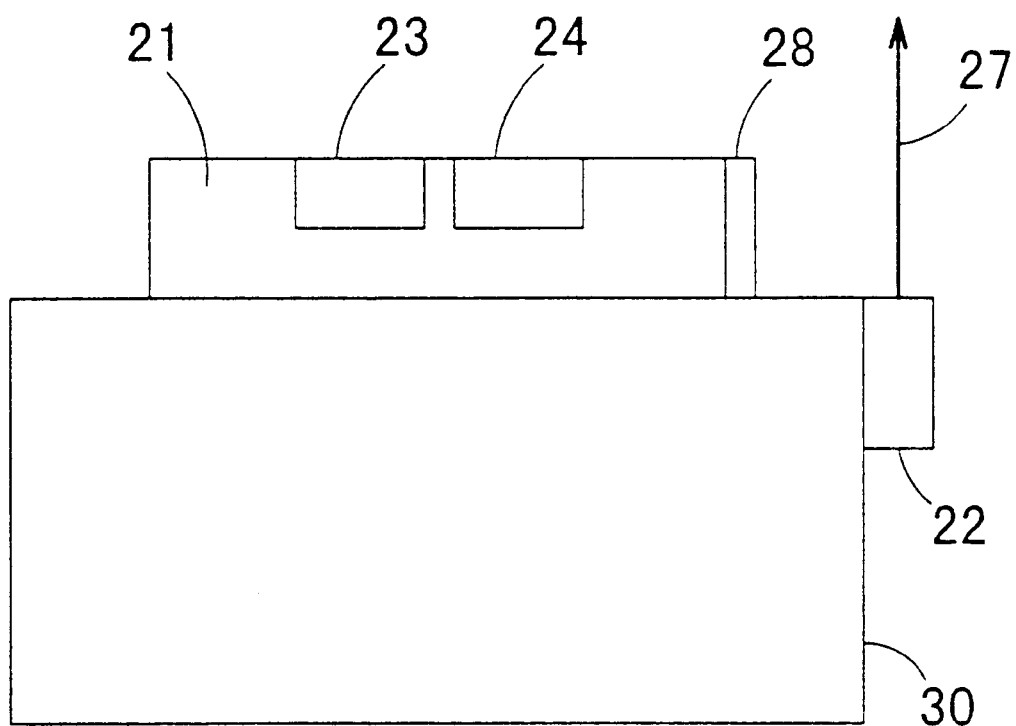
FIG. 6 is a cross-sectional view showing the configuration of the same optical semiconductor device.

FIG. 5 is a plan view schematically showing the plane layout of an optical semiconductor device in the third embodiment of the present invention. FIG. 6 is a schematic cross-sectional view taken on line A–A' of a semiconductor substrate 1 shown in FIG. 5.

Referring now to FIGS. 5 and 6, the optical semiconductor device is so configured that the underside of a semiconductor substrate 21 is bonded and fixed on the top side of a base board 30 in rectangular parallelepiped form, and a semiconductor laser element 22 is bonded and fixed onto the side of the base board 30. With this configuration, the semiconductor substrate 21, the semiconductor laser element 22, and the base board 30 are implemented by a single device. Thus, the semiconductor laser element 22 is provided in the lateral direction of the semiconductor substrate 21. The base board 30 comprises a metal such as copper, or plastics.

The semiconductor laser element 22 emits signal detection light in a direction substantially perpendicular to the top side of the semiconductor substrate 21 as shown by an arrow 27. Then, it irradiates an optical recording medium which is an object of signal detection with the signal detection light. Light receiving elements for signal detection 23, 24, 25, and 26 serve as light-receptive parts. They are formed on the top side of the semiconductor substrate 21, and receive return light from the optical recording medium.

A light shielding area 28 is selectively provided on the side of the semiconductor substrate 21 between the light receiving elements for signal detection 23, 24, 25, and 26, and the semiconductor laser element 22, and it comprises a material with a high reflectance. The materials, thickness, reflectance and the like thereof are the same as those in embodiment 1. The light shielding area 28 has a function as follows: that is, the stray light arising from the semiconductor laser element 22 is prevented from entering the semiconductor substrate 21 from the side of it, closer to the semiconductor laser element 22, toward the light receiving elements for signal detection 23, 24, 25, and 26; this inhibits the occurrence of stray light carriers around the side, closer to the semiconductor laser element 22, of the semiconductor substrate 21, i.e., around the light receiving elements for signal detection 23, 24, 25, and 26.

With the optical semiconductor device of this embodiment configured as described above, the operation thereof will now be described below.

First, at the instant when the semiconductor laser element 22 emits light, stray light occurs. The stray light tries to enter the side of the semiconductor substrate 21. However, the light shielding area 28 is provided on the side between the semiconductor laser element 22 and the light receiving elements for signal detection 23, 24, 25, and 26, out of the four sides of the semiconductor substrate 21. This can prevent the stray light from entering the semiconductor substrate 21 around the side of it, closer to the semiconductor laser element 22, i.e., around the light receiving elements for signal detection 23, 24, 25, and 26. This can inhibit the occurrence of stray light carriers on the surface of the semiconductor substrate 1, around the side of it, closer to the semiconductor laser element 22.

It is noted that the operation of receiving the return light of the signal detection light emitted from the semiconductor laser element 22 through the optical recording medium at the light receiving elements for signal detection 23, 24, 25, and 26 is the same as that in the preceding embodiments.

As described above, according to the third embodiment, the light shielding area 28 is provided on the side between the semiconductor laser element 22 and the light receiving elements for signal detection 23, 24, 25, and 26, out of the sides of the semiconductor substrate 21. This can prevent the stray light from entering the semiconductor substrate 21 from the side of it around the light receiving elements for signal detection 23, 24, 25, and 26, out of the sides of the semiconductor substrate 21. This can inhibit the occurrence of stray light carriers at the semiconductor substrate 21 around the side of it, closer to the semiconductor laser element 22, , i.e., around the light receiving elements for signal detection 23, 24, 25, and 26. Consequently, the stray light carriers at the semiconductor substrate 21 around the side, closer to the semiconductor laser element 22, can be prevented from being absorbed by the light receiving elements for signal detection 23, 24, 25, and 26. Therefore, the signals of the optical recording medium can be outputted with more precision.

[Fourth embodiment]

Below, a fourth embodiment of the present invention will be described with reference to the drawings.

Figure 7:
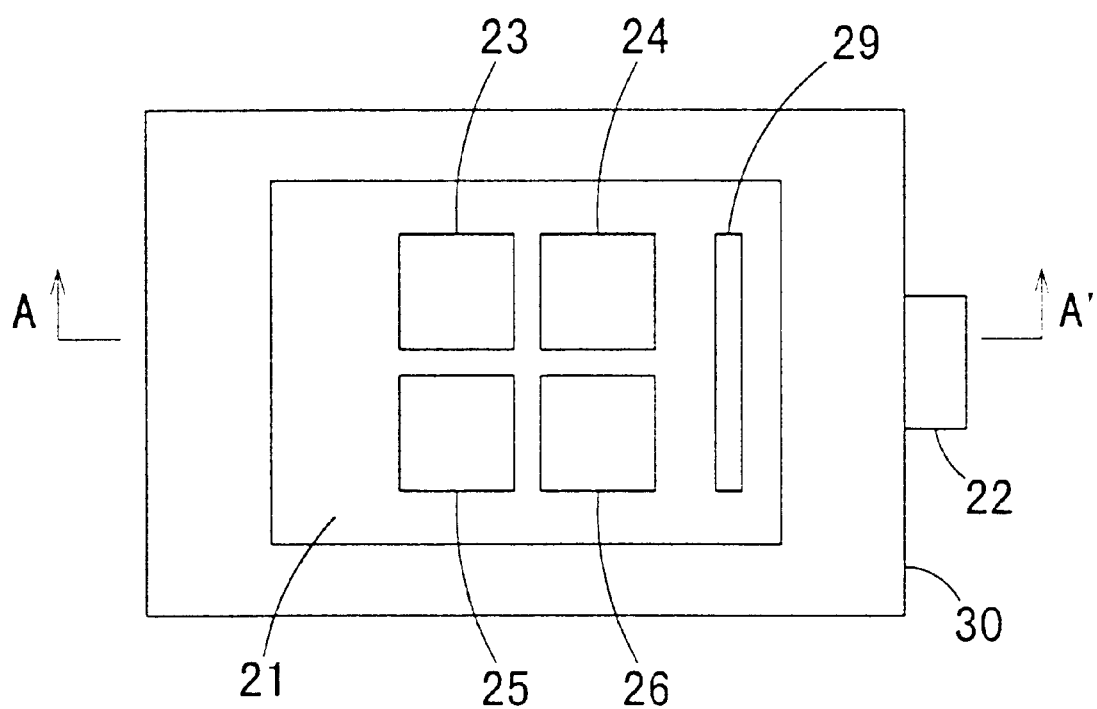
FIG. 7 is a plan view showing the configuration of an optical semiconductor device in a fourth embodiment of the present invention.
Figure 8:
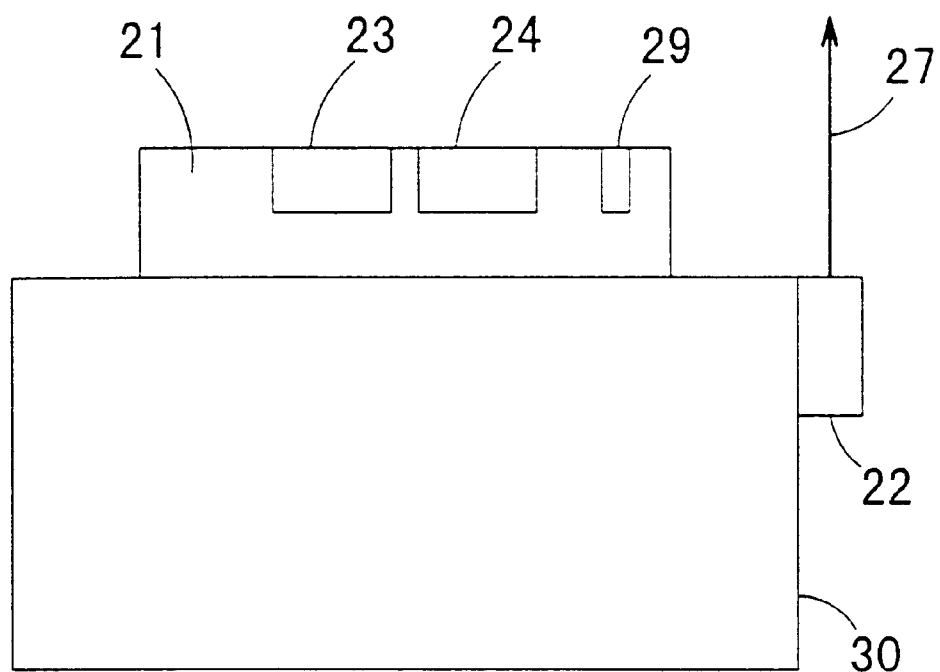
FIG. 8 is a cross-sectional view showing the configuration of the same optical semiconductor device.

FIG. 7 is a plan view schematically showing the plane layout of an optical semiconductor device in the fourth embodiment of the present invention. FIG. 8 is a schematic cross-sectional view taken on line A–A' of a semiconductor substrate 21 shown in FIG. 7.

Referring now to FIGS. 7 and 8, the optical semiconductor device is so configured that the underside of the semiconductor substrate 21 is bonded and fixed on the top side of a base board 30 in rectangular parallelepiped form, and a semiconductor laser element 22 is bonded and fixed onto the side of the base board 30. With this configuration, the semiconductor substrate 21, the semiconductor laser element 22, and the base board 30 are implemented by a single device. Thus, the semiconductor laser element 22 is provided in the lateral direction of the semiconductor substrate 21. The base board 30 comprises a metal such as copper, or plastics.

The semiconductor laser element 22 emits signal detection light in a direction substantially perpendicular to the top side of the semiconductor substrate 21 as shown by an arrow 27. Then, it irradiates an optical recording medium which is an object of signal detection with the signal detection light. The light receiving elements for signal detection 23, 24, 25, and 26 serve as light-receptive parts. They are formed on the top side of the semiconductor substrate 21, and receive return light from the optical recording medium.

An absorption area of stray light carriers 29 is selectively provided at the portion existing between the light receiving elements for signal detection 23, 24, 25, and 26, and the semiconductor laser element 22 on the top side of the semiconductor substrate 21. The absorption area of stray light carriers 29 comprises an impurity diffusion area having the same conductivity type as those of the light receiving elements for signal detection 23, 24, 25, and 26, i.e., an impurity diffusion area of conductivity type opposite to that of the semiconductor substrate 21, and it is reverse-biased.

Stray light arising from the semiconductor laser element 22 enters the semiconductor substrate 21 toward the light receiving elements for signal detection 23, 24, 25, and 26. This results in the occurrence of stray light carriers at the semiconductor substrate 21 around the side of it, closer to the semiconductor laser element 22, i.e., around the light receiving elements for signal detection 23, 24, 25, and 26. The absorption area of stray light carriers 29 has a function of absorbing the resulting stray light carriers.

With the optical semiconductor device of this embodiment configured as described above, the operation thereof will now be described below.

First, at the instant when the semiconductor laser element 22 emits light, stray light occurs. The stray light enters the side of the semiconductor substrate 21. Incidence of stray light on the side of the semiconductor substrate 21 results in the occurrence of stray light carriers on the surface of the semiconductor substrate 21. However, the absorption area of stray light carriers 29 is provided between the semiconductor laser element 22 and the light receiving elements for signal detection 23, 24, 25, and 26, on the semiconductor substrate 21. With this configuration, the absorption area of stray light carriers 29 absorbs the stray light carriers arising at the semiconductor substrate 21 around the side of it, closer to the semiconductor laser element 22, i.e., around the light receiving elements for signal detection 23, 24, 25, and 26. This prevents the carriers from being absorbed by the light receiving elements for signal detection 23, 24, 25, and 26.

It is noted that the operation of receiving the return light of the signal detection light emitted from the semiconductor laser element 22 through the optical recording medium at the light receiving elements for signal detection 23, 24, 25, and 26 is the same as those in the preceding embodiments.

As described above, according to the fourth embodiment, the absorption area of stray light carriers 29 is provided between the semiconductor laser element 22 lateral to the semiconductor substrate 21 and the light receiving elements for signal detection 23, 24, 25, and 26. This enables the absorption of the stray light carriers arising at the semiconductor substrate 21 around the side of it, closer to the semiconductor laser element 22, i.e., around the light receiving elements for signal detection 23, 24, 25, and 26, from stray light. Consequently, the stray light carriers at the semiconductor substrate 21 around the side of it, closer to the semiconductor laser element 22, can be prevented from being absorbed by the light receiving elements for signal detection 23, 24, 25, and 26. Therefore, the signals of the optical recording medium can be outputted with more precision.

[Fifth embodiment]

Below, a fifth embodiment of the present invention will be described with reference to the drawings.

Figure 9:
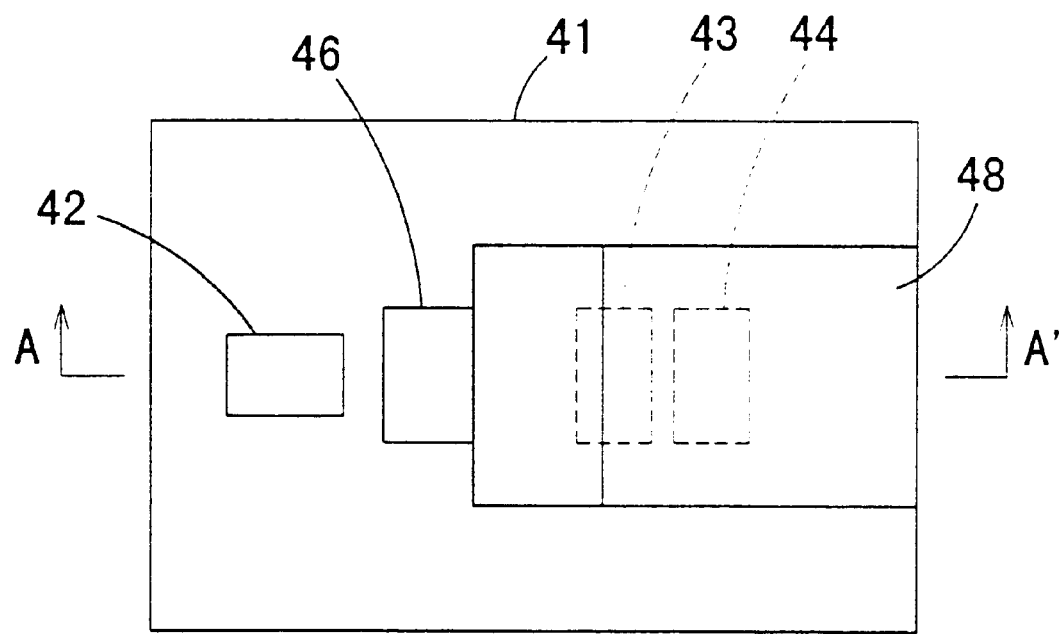
FIG. 9 is a plan view showing the configuration of an optical semiconductor device in a fifth embodiment of the present invention.
Figure 10:
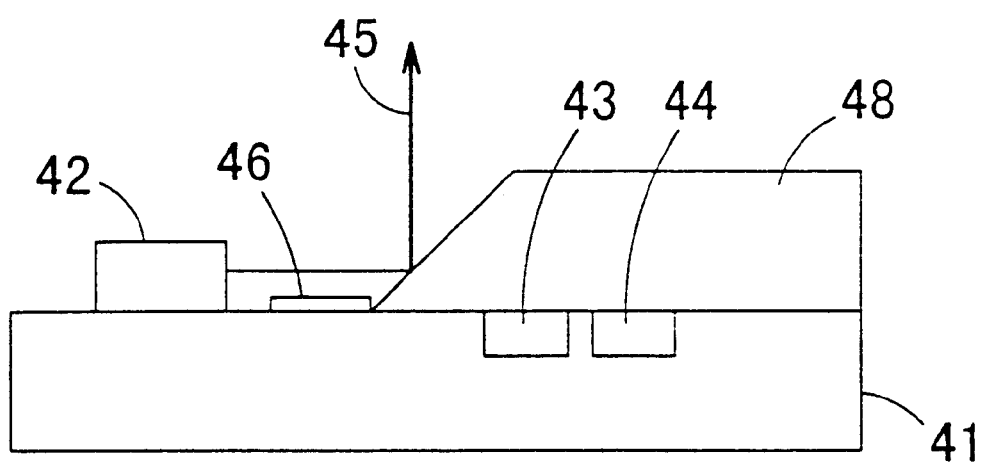
FIG. 10 is a cross-sectional view showing the configuration of the same optical semiconductor device.

FIG. 9 is a plan view schematically showing the plane layout of an optical semiconductor device in the fifth embodiment of the present invention. FIG. 10 is a schematic cross-sectional view taken on line A–A' of a semiconductor substrate 41 shown in FIG. 9.

Referring now to FIGS. 9 and 10, the optical semiconductor device is so configured that a semiconductor laser element 42 which serves as laser light source is mounted on the surface of the semiconductor substrate 41. The semiconductor laser element 42 irradiates an optical recording medium which is an object of signal detection with signal detection light. The light receiving elements for signal detection 43 and 44 serve as light-receptive parts. They are formed around the position on which the semiconductor laser element 42 is mounted on the surface of the semiconductor substrate 41, and receive return light from the optical recording medium. A micro-prism 48 is a transparent optical element having a reflection surface inclined to the surface of the semiconductor substrate 41. It is fixed on the semiconductor substrate 41, particularly on the light receiving elements for signal detection 43 and 44. The micro-prism 48 has a function of reflecting the signal detection light emitted substantially in parallel with the surface of the semiconductor substrate 41 from the semiconductor laser element 42 in a direction substantially perpendicular to the surface of the semiconductor substrate 41.

A light shielding area 46 is provided between the semiconductor laser element 41 and the micro-prism 48, on the surface of the semiconductor substrate 41, and it comprises a material with a high reflectance. The material, thickness, reflectance, and the like thereof are the same as those in the first embodiment. The light shielding area 46 has a function as follows: that is, the stray light arising from the semiconductor laser element 42 is prevented from entering the semiconductor substrate 41 toward the light receiving elements for signal detection 43 and 44; this inhibits the occurrence of stray light carriers at the semiconductor substrate 41 between the semiconductor laser element 42 and the light receiving elements for signal detection 43 and 44, i.e., around the light receiving elements for signal detection 43 and 44.

With the optical semiconductor device of this embodiment configured as described above, the operation thereof will now be described below.

First, at the instant when the semiconductor laser element 42 on the semiconductor substrate 41 emits light, stray light occurs. The stray light tries to enter the surface of the semiconductor substrate 41. However, the light shielding area 46 is provided between the semiconductor laser element 42 and the light receiving elements for signal detection 43 and 44, on the surface of the semiconductor substrate 41. This can prevent the stray light from entering the semiconductor substrate 41 around the semiconductor substrate 41 between the semiconductor laser element 42 and the light receiving elements for signal detection 43 and 44, i.e., around the light receiving elements for signal detection 43 and 44. This can inhibit the occurrence of stray light carriers on the surface of the semiconductor substrate 41, around the semiconductor substrate 41 between the semiconductor laser element 42 and the light receiving elements for signal detection 43 and 44.

It is noted that the operation of receiving the return light of the signal detection light emitted from the semiconductor laser element 42 through the optical recording medium at the light receiving elements for signal detection 43 and 44 is the same as those in the preceding embodiments.

As described above, according to the fifth embodiment, the light shielding area 46 is provided on the portion between the semiconductor laser element 42 and the light receiving elements for signal detection 43 and 44, on the surface of the semiconductor substrate 41. This can prevent the stray light from entering the semiconductor substrate 41 around the semiconductor substrate 41 between the semiconductor laser element 42 and the light receiving elements for signal detection 43 and 44, i.e., from the surface of the semiconductor substrate 41 around the light receiving elements for signal detection 43 and 44. This can inhibit the occurrence of stray light carriers around the semiconductor substrate 41 between the semiconductor laser element 42 and the light receiving elements for signal detection 43 and 44. Consequently, the stray light carriers can be prevented from being absorbed by the light receiving elements for signal detection 43 and 44. Therefore, the signals of the optical recording medium can be outputted with more precision

[Sixth embodiment]

Below, a sixth embodiment of the present invention will be described with reference to the drawings.

Figure 11:
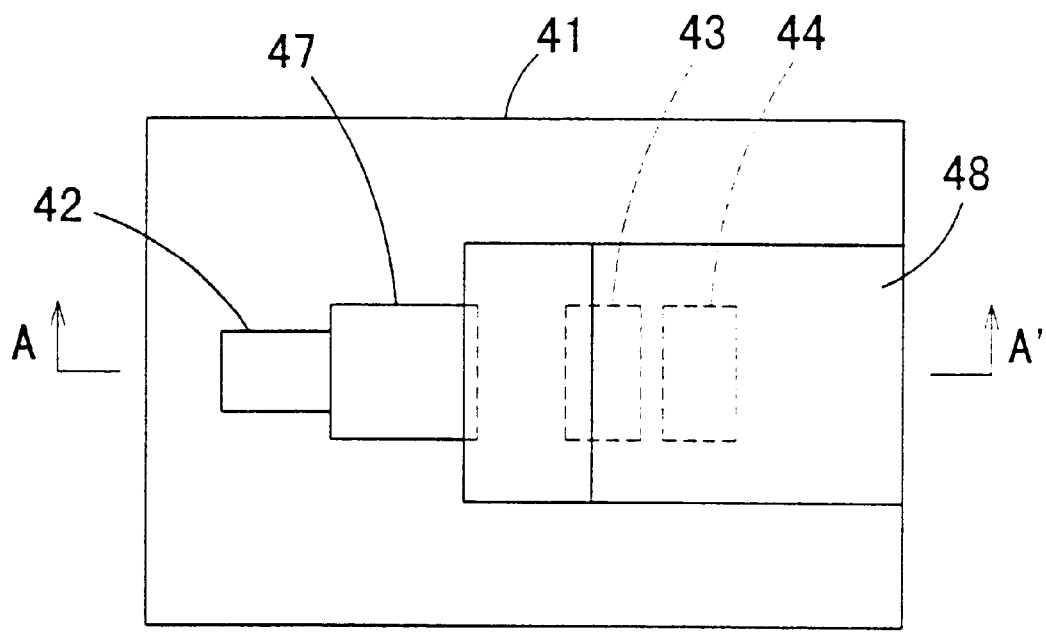
FIG. 11 is a plan view showing the configuration of an optical semiconductor device in a sixth embodiment of the present invention.
Figure 12:
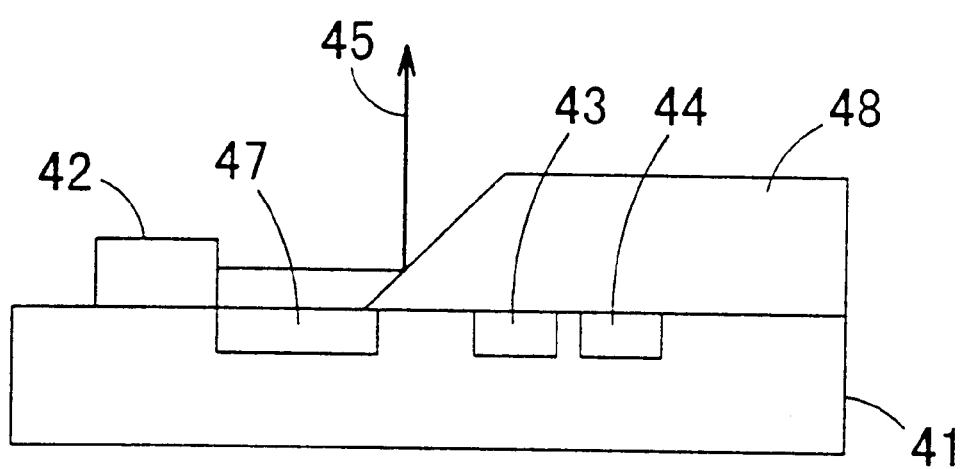
FIG. 12 is a cross-sectional view showing the configuration of the same optical semiconductor device.
Figure 13:
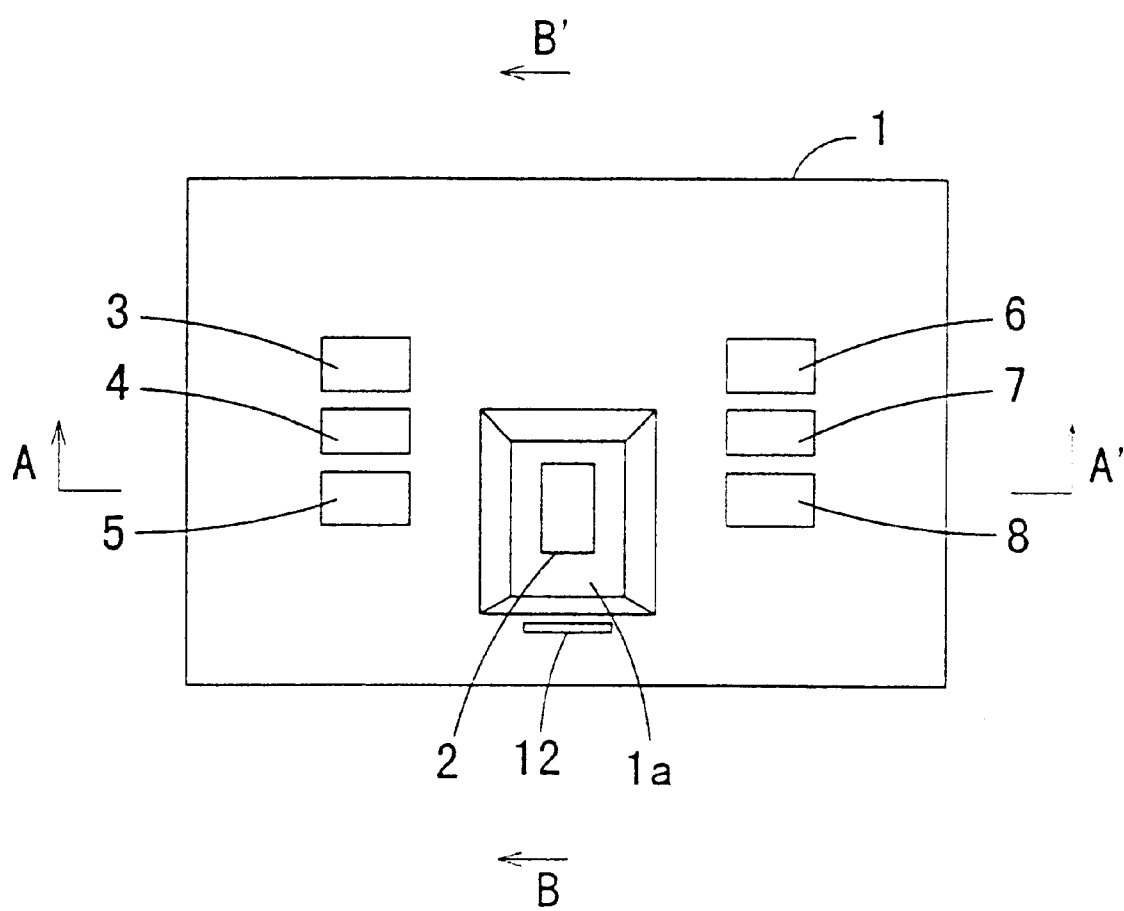
FIG. 13 is a plan view showing the configuration of a conventional optical semiconductor device.
Figure 14:
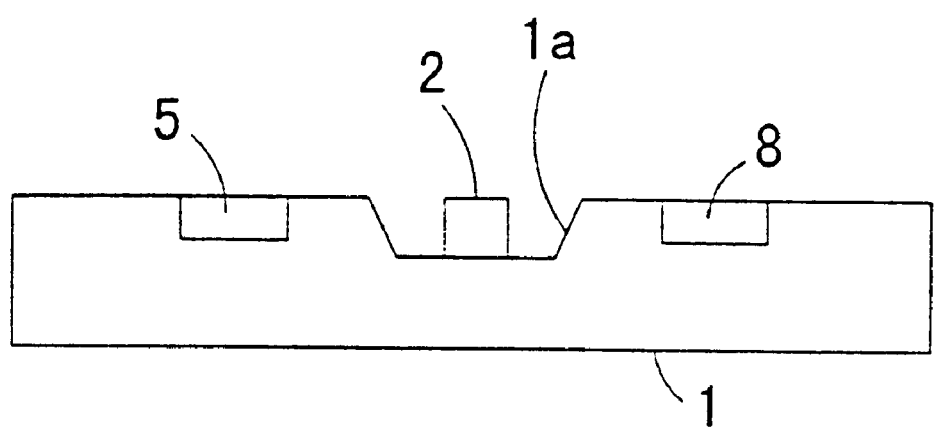
FIG. 14 is a cross-sectional view showing the configuration of the same optical semiconductor device.
Figure 15:
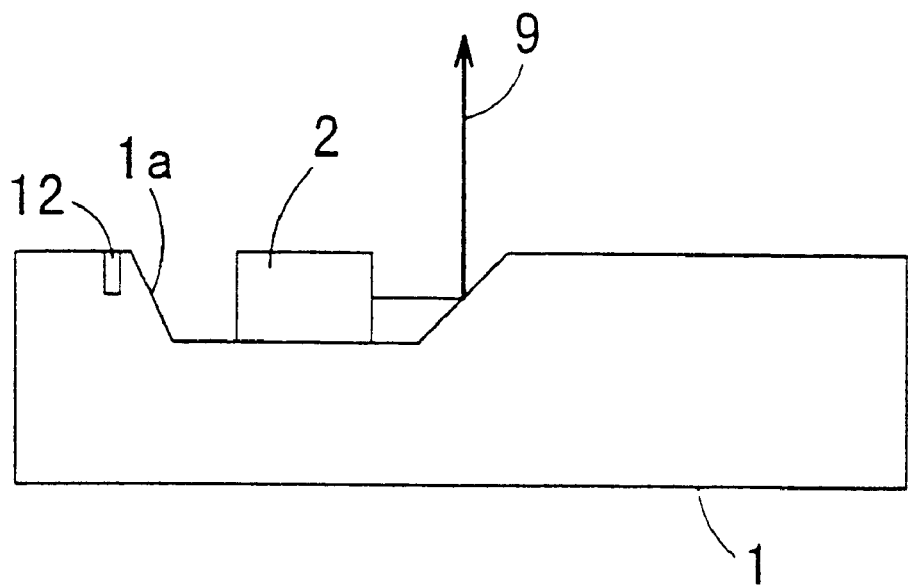
FIG. 15 is a cross-sectional view showing the configuration of the same optical semiconductor device.

FIG. 11 is a plan view schematically showing the plane layout of an optical semiconductor device in the sixth embodiment of the present invention. FIG.12 is a schematic cross-sectional view taken on line A–A' of a semiconductor substrate 41 shown in FIG. 11.

Referring now to FIGS. 11 and 12, the optical semiconductor device is so configured that a semiconductor laser element 42 which serves as laser light source is mounted on the surface of the semiconductor substrate 41. The semiconductor laser element 42 irradiates an optical recording medium which is an object of signal detection with signal detection light. The light receiving elements for signal detection 43 and 44 serve as light-receptive parts. They are formed around the position on which the semiconductor laser element 42 is mounted, in the surface of the semiconductor substrate 41, and receive return light from the optical recording medium. A micro-prism 48 is a transparent optical element having a reflection surface inclined to the surface of the semiconductor substrate 41. It is fixed on the semiconductor substrate 41, particularly on the light receiving elements for signal detection 43 and 44. The micro-prism 48 has a function of reflecting the signal detection light emitted substantially in parallel with the surface of the semiconductor substrate 41 from the semiconductor laser element 42 in a direction substantially perpendicular to the surface of the semiconductor substrate 41.

An absorption area of stray light carriers 47 is selectively provided on the portion existing between the semiconductor laser element 42 and the micro-prism 48, i.e., between the semiconductor laser element 42 and the light receiving elements for signal detection 43 and 44, on the surface of the semiconductor substrate 41. The absorption area of stray light carriers 47 comprises an impurity diffusion area having the same conductivity type as those of the light receiving elements for signal detection 43 and 44, i.e., an impurity diffusion area of conductivity type opposite to that of the semiconductor substrate 41. Between the absorption area of the stray light carriers 47 and the semiconductor substrate 41 is applied such a voltage as to result in a reverse bias.

The stray light arising from the semiconductor laser element 42 enters the semiconductor substrate 41 toward the light receiving elements for signal detection 43 and 44. This results in the occurrence of stray light carriers around the surface of the semiconductor substrate 41 between the semiconductor laser element 42 and the light receiving elements for signal detection 43 and 44, i.e., around the light receiving elements for signal detection 43 and 44. The absorption area of stray light carriers 47 has a function of absorbing the resulting stray light carriers.

With the optical semiconductor device of this embodiment configured as described above, the operation thereof will now be described below.

First, at the instant when the semiconductor laser element 42 on the semiconductor substrate 41 emits light, stray light occurs. The stray light enters the surface of the semiconductor substrate 41. Incidence of stray light on the surface of the semiconductor substrate 41 results in the occurrence of stray light carriers on the surface of the semiconductor substrate 41. However, the absorption area of stray light carriers 47 is provided on the semiconductor substrate 41 between the semiconductor laser element 42 and the light receiving elements for signal detection 43 and 44. With this configuration, the absorption area of stray light carriers 47 absorbs the stray light carriers arising around the surface of the semiconductor substrate 41 between the semiconductor laser element 42 and the light receiving element for signal detection 43 and 44, i.e., in the peripheral area of the light receiving elements for signal detection 43 and 44. This prevents the carriers from being absorbed by the light receiving elements for signal detection 43 and 44.

It is noted that the operation of receiving the return light of the signal detection light emitted from the semiconductor laser element 42 through the optical recording medium at the light receiving elements for signal detection 43 and 44 is the same as those in the preceding embodiments.

As described above, according to the sixth embodiment, the absorption area of stray light carriers 47 is provided at the surface of the semiconductor substrate 41 between the semiconductor laser element 42 and the light receiving elements for signal detection 43 and 44. This enables the absorption of the stray light carriers arising around the surface of the semiconductor substrate 41 between the semiconductor laser elements 42 and the light receiving element for signal detection 43 and 44, i.e., around the light receiving elements for signal detection 43 and 44. Consequently, the stray light carriers around the surface of the semiconductor substrate 41 between the semiconductor laser element 42 and the light receiving elements for signal detection 43 and 44 can be prevented from being absorbed by the light receiving elements for signal detection 43and 44. Therefore, the signals of the optical recording medium can be outputted with more precision.

What is claimed is:

1. An optical semiconductor device, comprising:

a semiconductor substrate of a first conductivity type;

a concave portion provided on the surface of said semiconductor substrate;

a laser light source for irradiating an object of signal detection with signal detection light, said laser light source being mounted on said concave portion;

a light-receptive part comprising an impurity diffusion area of an opposite conductivity type to said first conductivity type, for receiving return light from said object of signal detection, said light-receptive part being provided in a peripheral area of said concave portion on the surface of said semiconductor substrate; and a light shielding area provided on at least a side of said concave portion disposed between said laser light source and said light-receptive part, wherein:

the underside of said concave portion is a rectangular flat surface substantially parallel to the surface of said semiconductor substrate;

at least one side of said concave portion provides a reflection surface inclined relative to the underside of said concave portion;

said laser light source is fixed on the underside of said concave portion;

said signal detection light is emitted substantially parallel to the underside of said concave portion toward said reflection surface;

said signal detection light is reflected from said reflection surface in a direction substantially perpendicular to the surface of said semiconductor substrate; and said light shielding area prevents stray light resulting from said laser light source from entering the inside of said semiconductor substrate.

2. An optical semiconductor device according to claim 1, wherein said light shielding area comprises a metal film.

3. An optical semiconductor device, comprising:

a base board;

a semiconductor substrate;

a laser light source for irradiating an object of signal detection with signal detection light, said laser light source being mounted close to a side edge of said semiconductor substrate;

a light-receptive Part for receiving return light from said object of signal detection, said light-receptive part being provided on a top side of said semiconductor substrate; and a light shielding area provided on a side of said semiconductor substrate existing between said light-receptive part and said laser light source, wherein:

said signal detection light is emitted in a direction substantially perpendicular to the top side of said semiconductor substrate, the underside of said semiconductor substrate is fixed on a top side of said base board, and said laser light source is fixed on another side of said base board.

4. An optical semiconductor device according to claim 3, wherein said light shielding area comprises a metal film.

5. An optical semiconductor device, comprising:

a base board;

a semiconductor substrate;

a laser light source for irradiating an object of signal detection with signal detection light, said laser light source being mounted close to a side edge of said semiconductor substrate;

a light-receptive part for receiving return light from said object of signal detection, said light-receptive part being provided on a top side of said semiconductor substrate; and an absorption area for absorbing stray light carriers provided on said semiconductor substrate between said light-receptive part and said laser light source, wherein:

said signal detection light is emitted in a direction substantially perpendicular to the top side of said semiconductor substrate, an underside of said semiconductor substrate is fixed on a top side of said base board, and said laser light source is fixed on the side of said base board.

* * * * *